(12) United States Patent
Mihalik

(10) Patent No.: US 11,285,549 B2
(45) Date of Patent: Mar. 29, 2022

(54) METAL CUTTING INSERT FOR MILLING

(71) Applicant: PRAMET TOOLS, S.R.O., Sumperk (CZ)

(72) Inventor: Patrik Mihalik, Sumperk (CZ)

(73) Assignee: PRAMET TOOLS, S.R.O., Sumperk (CZ)

( * ) Notice: Subject to any disclaimer, the term of this patent is extended or adjusted under 35 U.S.C. 154(b) by 426 days.

(21) Appl. No.: 16/344,192

(22) PCT Filed: Aug. 16, 2017

(86) PCT No.: PCT/EP2017/070698
§ 371 (c)(1),
(2) Date: Apr. 23, 2019

(87) PCT Pub. No.: WO2018/077507
PCT Pub. Date: May 3, 2018

(65) Prior Publication Data
US 2019/0314906 A1 Oct. 17, 2019

(30) Foreign Application Priority Data

Oct. 25, 2016 (EP) ..................................... 16195578

(51) Int. Cl.
*B23C 5/20* (2006.01)
*B23C 5/06* (2006.01)

(52) U.S. Cl.
CPC ................ *B23C 5/06* (2013.01); *B23C 5/207* (2013.01); *B23B 2200/323* (2013.01); *B23C 2200/0477* (2013.01); *B23C 2200/286* (2013.01)

(58) Field of Classification Search
CPC ....... B23C 5/207; B23C 5/2217; B23C 5/205; B23C 5/2221; B23C 5/06; B23C 2200/08;
(Continued)

(56) References Cited

U.S. PATENT DOCUMENTS 4,074,949 A * 2/1978 Hochmuth .......... B23B 27/1614
407/100
4,294,566 A * 10/1981 Boone ................. B23B 27/1622
407/114
(Continued)

FOREIGN PATENT DOCUMENTS

DE 102011105978 A1 1/2013
DE 102011056422 A1 * 6/2013 ........... B23C 5/2213
(Continued)

*Primary Examiner* — Sara Addisu
(74) *Attorney, Agent, or Firm* — Corinne R. Gorski

(57) ABSTRACT

A reversible cutting insert for milling including opposing and identically or substantially identically top and bottom surfaces interconnected by a continuous peripheral side surface, with a median plane located between the top and bottom surfaces and intersecting the side surface, and an insert axis perpendicular to the median plane about which the cutting insert is indexable. Each top and bottom surface is limited by a circumferential cutting edge intersecting the side surface, the circumferential cutting edge in a top view having the shape of a truncated equilateral triangle. Each circumferential cutting edge includes three analogous sets of cutting edges exhibiting three-fold rotational symmetry about the insert axis. A first cutting edge portion intersects a first support plane.

14 Claims, 5 Drawing Sheets

(58) Field of Classification Search
CPC ...... B23C 2200/0477; B23C 2210/084; B23C 2200/286; B23C 2200/123; B23C 2200/0411; B23C 5/109; B23C 5/202; Y10T 407/192; Y10T 407/235; Y10T 407/1908; Y10T 407/23

See application file for complete search history.

(56) References Cited

U.S. PATENT DOCUMENTS

| | | | |
|---|---|---|---|
| 9,884,377 B2* | 2/2018 | Koike | B23C 5/2221 |
| 2007/0003384 A1* | 1/2007 | Smilovici | B23C 5/2221 |
| | | | 407/113 |
| 2010/0202839 A1* | 8/2010 | Fang | B23C 5/109 |
| | | | 407/53 |
| 2013/0129432 A1* | 5/2013 | Jaeger | B23C 5/109 |
| | | | 407/42 |
| 2013/0251464 A1 | 9/2013 | Hecht | |
| 2014/0010605 A1 | 1/2014 | Smilovici et al. | |
| 2014/0334890 A1* | 11/2014 | Takahashi | B23C 5/2213 |
| | | | 407/114 |
| 2014/0377020 A1* | 12/2014 | Kurokawa | B23B 27/1659 |
| | | | 407/51 |
| 2015/0202697 A1* | 7/2015 | Shiota | B23C 5/109 |
| | | | 407/42 |
| 2016/0082528 A1* | 3/2016 | Ballas | B23C 5/06 |
| | | | 407/48 |
| 2016/0375506 A1* | 12/2016 | Koike | B23C 5/2221 |
| | | | 407/48 |

FOREIGN PATENT DOCUMENTS

| | | | | |
|---|---|---|---|---|
| EP | 2131982 B1 | 2/2014 | | |
| EP | 2774705 A1 | 9/2014 | | |
| EP | 2898969 A1 | 7/2015 | | |
| EP | 2998053 A1 | 3/2016 | | |
| JP | S6025604 A | 2/1985 | | |
| RU | 2279334 C2 | 7/2006 | | |
| RU | 2584625 C1 | 5/2016 | | |
| SU | 814573 A1 | 3/1981 | | |
| WO | WO-2014021314 A1 * | 2/2014 | ............... | B23C 5/06 |
| WO | WO-2014081011 A1 * | 5/2014 | ............... | B22F 7/06 |
| WO | WO-2015080168 A1 * | 6/2015 | ............ | B23C 5/109 |
| WO | 2015156373 A1 | 10/2015 | | |

\* cited by examiner

METAL CUTTING INSERT FOR MILLING

RELATED APPLICATION DATA

This application is a § 371 National Stage Application of PCT International Application No. PCT/EP2017/070698 filed Aug. 16, 2017 claiming priority to EP 16195578.6 filed Oct. 25, 2016.

TECHNICAL FIELD OF THE INVENTION

The present invention belongs to the technical field of metal cutting. More specifically the present invention belongs to the field of milling inserts used for metal cutting in machines such as CNC-machines, in particular to milling cutters which can be used to form two perpendicular surfaces. Such milling inserts are commonly known as square shoulder milling insert.

BACKGROUND OF THE INVENTION AND PRIOR ART

The present invention refers to a cutting insert for milling. Within the field of square shoulder milling, there are many examples of reversible, or double sided usable, cutting insert. One such milling insert is disclosed in EP2998053, where the circumferential cutting edge in a top view having the shape of a truncated equilateral triangle. Said milling insert are usable six times, because three identical sets of cutting edge portions are formed adjacent to each of opposite top and bottom surfaces.

Said milling insert comprises a major relief surface, or a reversed relief surface, which generally extends outwardly, i.e. in a direction away from an insert axis from an associated major cutting edge towards a median plane, so that each major cutting is beneficially supported and advantageously robust.

The inventor has found that there is potential for further improvement for such milling insert.

SUMMARY OF THE INVENTION

An object of the present invention is to provide a six times indexable cutting insert, suitable for square shoulder milling, having improved chip control.

This object is achieved by the cutting insert according to the present invention, where it is provided a reversible cutting insert for milling, comprising: opposing and identical or substantial identically top and bottom surfaces interconnected by a continuous peripheral side surface, with a median plane located between the top and bottom surfaces and intersecting the side surface, and an insert axis perpendicular to the median plane about which the cutting insert is indexable, each top and bottom surface is limited by a circumferential cutting edge intersecting the side surface, the circumferential cutting edge in a top view having the shape of a truncated equilateral triangle, each circumferential cutting edge comprising three analogous sets of cutting edges exhibiting three-fold rotational symmetry about the insert axis, each set of cutting edges comprising a first cutting edge portion, a second cutting edge portion and a third cutting edge portion, the second cutting edge portion being convex in a top view and connecting the first cutting edge portion and the third cutting edge portion, the first and third cutting edge portions each being straight or substantially straight in a top view, the first cutting edge portion being longer than the third cutting edge portion, the first cutting edge portion and the third cutting edge portion forming a right angle or a substantially right angle in a top view, the first cutting edge portion sloping towards the median plane away from the second cutting edge portion, the top surface comprises a first flat surface, the first flat surface being spaced apart from the circumferential cutting edge, the first flat surface being located in a first support plane parallel to the median plane, the bottom surface comprises a second flat surface, the second flat surface being spaced apart from the circumferential cutting edge, the second flat surface being located in a second support plane parallel to the median plane, the side surface comprises three analogous sets of surface segments exhibiting three-fold rotational symmetry about the insert axis, each set of surface segments comprises a first side surface portion, a second side surface portion and a third side surface portion, first side surface portion being located between and connecting the second side surface portion and the third side surface portion, the second side surface portion being adjacent to and extending away from the first cutting edge portion intersecting the top surface, the third side surface portion being adjacent to and extending away from a first cutting edge portion intersecting the bottom surface, in a top view a first straight line from the insert axis to the second cutting edge adjacent to the top surface and a second straight line from the insert axis to a second cutting edge formed adjacent to the bottom surface form an angle greater than zero in relation to each other, characterized in that the first cutting edge portion intersects the first support plane.

The inventor has found that by such a cutting insert, the chip control is improved at large cutting depth, as well as at smaller cutting depths. At larger cutting depths, a surface portion of the top surface between the first support plane and the part of the first cutting edge portion which is between the first support plane and the median plane can advantageously effect the chips cut. At smaller cutting depths, the inventor has found that chip evacuation is improved. This may be attributed to the fact that the cutting insert do not comprise a circumferential cutting edge which is entirely raised, in a side view, in relation to the first flat surface. Rather, the circumferential cutting edge is only partially raised in relation to the first flat surface, such that chips cut can easily move in a direction away from the cutting insert (improved chip evacuation), instead of risking being stuck inside a raised circumferential cutting edge.

The effect of the downward sloping first cutting edge portion is reduced cutting forces and improved chip control, in comparison to a first cutting edge portion parallel to the median plane. It is advantageous to have a sufficiently great sloping angle for the first cutting edge. In order to achieve a sufficiently great sloping angle without the first cutting edge portion intersecting the first support plane, especially the second cutting edge portion would need to be raised in relation to the first support plane, in a side view, a relatively great distance. Such a cutting insert would have the disadvantage that the pressing of the cutting insert would be difficult, possibly resulting in uneven compaction of powder (relatively greater compaction adjacent to the first, second and third cutting portions), resulting in increased risk of cracks after pressing and sintering. These risks can be reduced by having a first cutting edge portion which intersects the first support plane.

The cutting insert is reversible in such a way that both the top and bottom surfaces can be alternatively used facing the direction of rotation of a milling tool. The cutting insert is preferably a milling insert, even more preferably a square shoulder milling insert.

The top and bottom surfaces are substantially identical in shape.

A continuous, and circumferential, peripheral side surface connects the first and second end surfaces.

In an active state, at least a first portion of the peripheral side surface is a clearance surface, while at least a second portion of the peripheral side surface, spaced apart from said first portion, is a support surface.

Each top and bottom surface is limited by a circumferential cutting edge intersecting the side surface, in other words the circumferential cutting edge separates the side surface from top and bottom surfaces, respectively. The circumferential cutting edge may comprise a plurality of notches or cut-outs, e.g. for the purpose of deviding the chips cut into smaller segments.

In an active state, at least a portion of the top surface comprises a rake face, while at least a portion of the bottom surface comprises a support surface.

An imaginary median plane is located or contained equidistantly between the top and bottom surfaces and intersecting the side surface, and an imaginary insert axis is extending perpendicular to the median plane about which the cutting insert is indexable. The top surface, the bottom surface and the side surface each have a three-fold symmetry, i.e. 120° symmetry, around the insert axis.

Preferably, a hole for a screw extends between the top and bottom surfaces. Preferably, said hole for a screw is perpendicular to the median plane and concentric around the insert axis.

The top surface comprises a first flat surface spaced apart from the circumferential cutting edge bordering to the top surface, and the bottom surface comprises a second flat surface spaced apart from the circumferential cutting edge which borders to the bottom surface.

The first flat surface, which is suitable for being a support surface, is located or contained in a first support plane parallel to the median plane and perpendicular to the insert axis.

The bottom surface comprises a second flat surface, which is suitable for being a support surface. The second flat surface being spaced apart from the circumferential cutting edge which borders to the bottom surface. The second flat surface is located or contained in a second support plane parallel to the median plane and perpendicular to the insert axis. A shortest distance between the first and second support planes is preferably 3.0-4.2 mm.

The circumferential cutting edge in a top view is shaped as truncated equilateral triangle. More precisely, the circumferential cutting edge in a top view is shaped as equilateral triangle where the three corners are truncated in an identical manner, such that the circumferential cutting edge in a top view comprises six sides, and where the length of the sides are alternatingly long and short.

More precisely, in a top view the circumferential cutting edge is shaped as a polygon having six sides of alternating short and long length, where the long side is preferably 2-5 times the length of the short sides, and where each pair of sides are connected by convex sections, and where adjacent pair of sides alternatingly form 90° or 150° angles in relation to each other.

In a top view, a circle concentric with the insert axis and having a radius thereof defined as a shortest distance between the circumferential cutting edge bordering the top surface and the insert axis intersect the circumferential cutting edge bordering the top surface at three points, where said three points are located at three first cutting edge portions.

Each circumferential cutting edge, i.e. the circumferential cutting edge bordering the top surface and the circumferential cutting edge bordering the bottom surface, comprises three analogous or identical sets of cutting edges exhibiting three-fold rotational symmetry, i.e. 120° symmetry, about the insert axis. In other words, the cutting insert comprises six analogous sets of cutting edge. The cutting insert is six times useable.

Each set of cutting edges comprising three cutting edge portions.

The first cutting edge portion is a main cutting edge. In a top view, the first cutting edge portions bordering the top surface are straight and represent the sides, or the longest sides, of a truncated equilateral triangle.

The second cutting edge portion, which is a corner cutting edge, is convex in a top view, and the second cutting edge portion is the cutting edge portion, or the portion of the cutting edge, which in top view is most distant from the insert axis. Preferably, the second cutting edge portion is the cutting edge portion, or the portion of the cutting edge, which is most distant from the median plane.

The second cutting edge portion connects, and borders to, the first cutting edge portion and the third cutting edge portion.

The first and third cutting edge portions, connected by the second cutting edge, are each straight or substantially straight in a top view, and forms a right angle, i.e. a 90° angle, or a substantially right angle in a top view in relation to each other.

In a top view, the third cutting edge preferably forms an angle of 150° in relation to a first cutting edge portion which first cutting edge portion is part of an adjacent set of cutting edge portions.

The third cutting edge portion is a surface generating cutting edge, suitable to be located in a plane perpendicular to an axis of rotation of a milling tool.

The first cutting edge portion is longer than the third cutting edge portion; in a top view the first cutting edge portion is preferably 3-20 mm, even more preferably 3-8 mm.

The first cutting edge portion slopes towards the median plane, i.e. downwards in a side view where the top surface which the first cutting edge portion borders is upwards, in a direction away from the second cutting edge portion. In other words, in a side view, the first cutting edge portion slopes towards the median plane in a direction away from the second cutting edge portion. In other words, the first cutting edge portion, or more precisely a line co-linear with the first cutting edge portion, form an angle greater than zero, preferably 10-24°, even more preferably 14-20°, in relation to the median plane.

Corresponding central points of the second cutting edge portions adjacent to the top surface are located in a first common plane, and correspondingly corresponding central points of the second cutting edge portions adjacent to the bottom surface are located in a second common plane, and a shortest distance between said first and second common planes is preferably 4-8 mm.

The side surface comprises three analogous sets of surface segments exhibiting three-fold rotational symmetry, i.e. a 120° symmetry, about or around the insert axis.

The first side surface portion, which is a contact surface, is located or situated between and connecting the second side surface portion and the third side surface portion. The first side surface portion is preferably located in a plane perpendicular to the median plane.

The second side surface portion is adjacent to and extending away from the first cutting edge portion, which first cutting edge portion intersects or borders the top surface. Formulated differently, a first borderline of the second side surface portion, defined by the first cutting edge portion, is in top view located closer to the insert axis in comparison to an opposite second borderline of the second side surface portion, where said second borderline is defined as the border or intersection between the first and second side surface portions. This gives a more robust first cutting edge portion, resulting in less wear.

The third side surface portion is arranged in a corresponding manner, as the described second side surface portion, in relation to a first cutting edge portion bordering the bottom surface.

In a top view a first straight line from the insert axis to the second cutting edge adjacent to the top surface and a second straight line from the insert axis to a second cutting edge formed adjacent to the bottom surface form an angle greater than zero, preferably 5-20°, in relation to each other. Further, in a top view the first cutting edge portions bordering the top surface and the first cutting edge portions bordering the bottom surface are twisted relative to each other, i.e. said first cutting edge portions are not aligned.

The first cutting edge portion intersect the first support plane, i.e. one sub-portion of the first cutting edge portion and a second subportion of the first cutting edge portion are located on opposite sides of the first support plane.

The cutting insert is made from a hard and wear resistant material such as preferably cemented carbide.

According to an embodiment, the third cutting edge portion is sloping towards the median plane away from the second cutting edge portion, wherein the third cutting edge portion (8) forms an angle in relation to the median plane which is 26-32°.

The inventor has found that such a cutting insert gives a relative longer secondary cutting edge, which gives a reduced wear because wear is distributed over a greater length or distance, compared to a third cutting edge portion parallel to the median plane. The inventor has found that the surface finish is improved.

The third cutting edge portion, which is a surface generating secondary cutting edge, is sloping towards the median plane away from the second cutting edge portion. In other words, both the first and third cutting edge portion rise, in relation to the median plane, towards the second cutting edge portion which connects said first and third cutting edge portions. The second cutting edge portion or portions is/are the portion or portions of the cutting edge which is located at the greatest distance, i.e. greater than all other cutting edge portions, from the median plane.

The third cutting edge portion forms an angle in relation to the median plane which is 26-32°, i.e. a line which coincides with the third cutting edge portion intersects the median plane at an angle of 26-32°.

The angle which the third cutting edge portion forms in relation to the median plane is preferably greater than the angle which the first cutting edge portion forms in relation to the median plane.)

According to an embodiment, the first cutting edge portion is divided into a first sub-portion located between the first support plane and the median plane, and a second sub-portion located on the opposite side of the first support plane, wherein the length of said first sub-portion is shorter than the length of said second sub-portion.

The inventor has found that such a cutting insert gives an optimum balance between chip evacuation and cutting forces.

The first cutting edge portion, bordering the top surface, is divided into a first sub-portion located between the first support plane and the median plane, and a second sub-portion located on the opposite side of the first support plane in relation to said first sub-portion. Said first and second sub-portions are preferably co-linear. Said second sub-portions is at one end connected to said first sub-portion, and is at an opposite second end connected to the second cutting edge portion.

The length of said first sub-portion is shorter than the length of said second sub-portion. Preferably, the length of said second sub-portion is 250-400% of the length of said first sub-portion.

According to an embodiment, a fourth cutting edge portion connects the third cutting edge portion and a fifth cutting edge portion, wherein the third cutting edge portion, the fourth cutting edge portion and the fifth cutting edge portion are aligned in a top view, wherein the fourth cutting edge portion is convex in a side view, wherein the fifth cutting edge portion intersect the median plane, wherein a sixth cutting edge portion connects the first cutting edge portion and the fifth cutting edge portion, wherein the sixth cutting edge portion is convex in a top view and concave in a side view.

The fourth cutting edge portion, which is convex or convexly curved in a side view, smoothly connects the third cutting edge portion, which preferably is linear or straight, and the fifth cutting edge portion, which preferably is linear or straight.

The third cutting edge portion, the fourth cutting edge portion and the fifth cutting edge portion are aligned, or co-linear in a top view, and jointly, in a top view, form the truncated corner of the equilateral triangle which the circumferential cutting edge forms in a top view.

The third cutting edge portion, the fourth cutting edge portion and the fifth cutting edge portion are spaced apart from the first support plane.

The fifth cutting edge portion intersect the median plane, such that the fifth cutting edge is divided into one sub-portion of the fifth cutting edge and a second sub-portion of the fifth cutting edge, where said sub-portions are located on opposite sides in relation to the first support plane. Preferably, the length of said first sub-portion is 75-125% of the length of said second sub-portion.

The angle which the fifth cutting edge portion forms in relation to the median plane is preferably greater than the angle which the third cutting edge portion forms in relation to the median plane.

The sixth cutting edge portion connects the first cutting edge portion and the fifth cutting edge portion, where said first cutting edge portion is a part of an adjacent set of cutting edge portions.

The sixth cutting edge portion is convex in a top view and concave in a side view, and is preferably entirely located between the first support plane and the median plane.

According to an embodiment, the fifth cutting edge portion forms an angle in relation to the median plane which is greater than the angle which the third cutting edge portion forms in relation to the median plane.

The inventor has found that such a cutting insert gives improved performance in ramping.

According to an embodiment, in a plane comprising the insert axis and a center point of the second cutting edge portion, a distance from the insert axis to a point at the side surface intersecting the median plane is shorter than a distance from the insert axis to a center point of the second cutting edge portion.

The inventor has found that such cutting insert has advantageous effects relating to when the insert is mounted in an insert seat.

In a plane comprising the insert axis and a center point, or mid-point, of the second cutting edge portion, a shortest distance, measured in the median plane, from the insert axis to a point at the side surface intersecting the median plane is shorter than a shortest distance from the insert axis to a center point of the second cutting edge portion. In other words, said point at the side surface is in top view inside the circumferential cutting edge.

According to an embodiment, an eighth side surface portion is limited by an upper boundary line comprising the second cutting edge portion, an opposite lower boundary line, and two opposite side boundary lines, wherein a shortest distance from said upper boundary line to said opposite lower boundary line is 0.1-0.6 mm.

The inventor has found that such a cutting insert has improved wear monitoring capabilities. In other words, it is easier for a user of the cutting insert to detect when change of insert or indexing of insert is necessary. The inventor has found that the second cutting edge portion is subjected to the greatest insert wear, and therefor is limiting for the tool life. Thus, the inventor has found that improve wear monitoring capability for the portion of the side surface adjacent to the second cutting edge portion is an advantage and reduces the risk of insert breakage.

The eighth side surface portion is a clearance surface adjacent to the second cutting edge portion.

The eighth side surface portion is limited by an upper boundary line comprising the second cutting edge portion, an opposite lower boundary line between the second cutting edge portion and the median plane, and two opposite side boundary lines.

A shortest distance from said upper boundary line to said opposite lower boundary line is 0.1-0.6 mm. The inventor has found that such interval is suitable in determining wear, especially flank wear.

Said shortest distance is preferably spaced apart and between said opposite side boundary lines.

The eighth side surface portion, adjacent to the top surface, is preferably entirely located between the first support plane and the median plane.

Preferably, a distance from the upper boundary line to the opposite lower boundary line is decreasing from each of the opposite side boundary lines towards a center portion of the eighth side surface portion.

According to an embodiment, the top surface comprises a first rake surface adjacent to the first cutting edge portion, a second rake surface adjacent to the second cutting edge portion and a third rake surface adjacent to the third cutting edge portion, wherein the first, second and third rake surfaces are sloping towards the first support plane away from the respective adjacent cutting edge portion, wherein the first, second and third rake surfaces are limited by an inner border line spaced apart from the respective adjacent cutting edge portion, wherein a greatest distance in a top view, measured perpendicular to the first cutting edge portion, from the first cutting edge portion to the inner border line is greater than a greatest distance in a top view, measured perpendicular to the third cutting edge portion, from the third cutting edge portion to the inner border line.

The inventor has found that such a cutting insert improves the direction of chips cut away from the machined surface, thereby reducing risk of poor surface quality of the machined component.

The top surface comprises a first rake surface adjacent to the first cutting edge portion. Preferably a major portion of the first rake surface is raised in a side view in relation to the first support plane. Preferably the first rake surface intersects the first support plane. Preferably the first rake surface forms an acute angle in relation to the adjacent second side surface portion.

The top surface comprises a second rake surface adjacent to the second cutting edge portion and a third rake surface adjacent to the third cutting edge portion.

Preferably, each of the first, second and third rake surfaces together form a continuous smooth, i.e. step-free or uninterrupted, surface.

The first, second and third rake surfaces are sloping towards the first support plane, i.e. towards the median plane, away from the respective adjacent cutting edge portion. Thus, a distance from the median plane to a first point of the first, second or third cutting edge portion is greater than a distance from the median plane to a second point of the corresponding first, second or third rake surface, respectively, where said second point is located perpendicular in top view in relation to said first point.

Each of the first, second and third rake surfaces are limited by an inner border line spaced apart from and opposite the respective adjacent cutting edge portion.

Preferably, the second rake surface is raised, or spaced apart, in relation to the first support plane, such that a second step portion connects the first flat surface and the second rake surface.

Each of the first, second and third rake surfaces are suitable for being in contact with the work piece being cut.

According to an embodiment, the top surface comprises a first rake surface adjacent to the first cutting edge portion, a second rake surface adjacent to the second cutting edge portion and a third rake surface adjacent to the third cutting edge portion, wherein the first, second and third rake surfaces are sloping towards the median plane away from the respective adjacent cutting edge portion, wherein a first rake angle, defined by the angle which the first rake surface forms in relation to the median plane, is greater than a third rake angle, defined by the angle which the third rake surface forms in relation to the median plane.

The inventor has found that such a cutting insert improves the direction of chips cut away from the machined surface, thereby reducing risk of poor surface quality of the machined component.

The second and third rake surfaces and at least a portion of the first rake surface are sloping towards the first support plane away from the respective adjacent cutting edge portion. The first, second and third cutting edge each has a positive rake angle.

A first rake angle, defined by the angle which the first rake surface forms in relation to the median plane, is greater than a third rake angle, defined by the angle which the third rake surface forms in relation to the median plane. The first and third rake angles are measured in a plane perpendicular to the respective first or second cutting edge portion. In other words, the first cutting edge is more positive, i.e. has a more positive rake angle, in comparison with the third cutting edge portion. Said first rake angle is preferably 20-50°, even more preferably 32-42°.

According to an embodiment, a distance in a side view measured perpendicular to the median plane from the first cutting edge portion to the first side surface portion is decreasing or substantially decreasing away from the second cutting edge portion towards the sixth cutting edge portion.

By such a cutting insert, the first side surface portion can be made having a relatively great area and/or a substantially constant height in a side view, thereby improving the stability when mounted in an insert seat.

A distance in a side view measured perpendicular to the median plane from the first cutting edge portion to the first side surface portion is decreasing or substantially decreasing away from the second cutting edge portion towards the sixth cutting edge portion.

In other words, an upper border line of the first side surface portion, i.e. a border line between the first side surface portion and the second side surface portion, is gradually closer to the first cutting edge portion in a direction away from the second cutting edge portion.

The first side surface portion is preferably a contact or support surface. The area of the first side surface portion is in a side view preferably greater than the area in a side view of the second side surface portion.

According to an embodiment, each set of surface segments comprises a fourth side surface portion, a fifth side surface portion, a sixth side surface portion, a seventh side surface portion, an eighth side surface portion and a ninth side surface portion, wherein the first side surface portion is located in a plane perpendicular to the median plane, wherein the fourth side surface portion borders to the fifth cutting edge portion and is spaced apart from the bottom surface, wherein the fifth side surface portion borders to the third cutting edge portion and is spaced apart from the bottom surface,
wherein the sixth side surface portion borders to a fifth cutting edge portion formed adjacent to the bottom surface, and wherein the sixth side surface portion is spaced apart from the top surface,
wherein the fourth side surface portion, the fifth side surface portion, the sixth side surface portion and the seventh side surface portion each intersects the median plane, wherein the seventh side surface portion borders to a third cutting edge portion formed adjacent to the bottom surface, and wherein the seventh side surface portion is spaced apart from the top surface, wherein a border line, formed between the fifth side surface portion and the seventh side surface portion, forms an angle smaller than 90° in relation to the median plane, wherein in a top view, the fifth side surface portion is located a greater distance outwardly in relation to the circumferential cutting edge than all other parts of the side surface, wherein in a top view, the second side surface portion is located an increasing or substantially increasing distance outwardly in relation to the circumferential cutting edge from the sixth cutting edge portion towards the second cutting edge portion.

The first side surface portion is in a plane perpendicular to the median plane. Each set of surface segments, or side surface segments, comprises nine surface portion segments. The fourth side surface portion borders to the fifth cutting edge portion, is spaced apart from the bottom surface, and preferably borders to the first side surface portion and the fifth side surface portion. The fifth side surface portion borders to the third cutting edge portion, is spaced apart from the bottom surface, and preferably borders to fourth, seventh, eighth and ninth side surface portions. The width of the fifth side surface portion in a side view, measured in planes parallel to the median plane, is preferably increasing or substantially increasing towards the top surface.

The sixth side surface portion borders to a fifth cutting edge portion formed adjacent to the bottom surface, and the sixth side surface portion is spaced apart from the top surface, the sixth side surface portion preferably borders to the first, second and seventh side surface portions. The width of the sixth side surface portion in a side view, measured in planes parallel to the median plane, is preferably decreasing or substantially decreasing towards the top surface.

The seventh side surface portion borders to a third cutting edge portion formed adjacent to the bottom surface, is spaced apart from the top surface, and preferably borders to the fifth, sixth, eighth and ninth side surface portions. The width of the seventh side surface portion in a side view, measured in planes parallel to the median plane, is preferably decreasing or substantially decreasing towards the top surface.

A border line is formed between the fifth side surface portion and the seventh side surface portion. Preferably, said border line is at one end bordering to the eighth side surface portion and at one opposite end bordering to the ninth side surface portion. Preferably, said border line is spaced apart from the top and bottom surfaces.

Said border line forms an angle smaller than 90° in relation to the median plane. Thus said border line is non-parallel to the insert axis.

According to an embodiment, the first flat surface extends continuously around the insert axis.

By such a cutting insert, the flat surface which is a support surface can be chosen having a grater area, thereby improving the stability when mounted in an insert seat. By such a cutting insert, an insert seat in a tool body, especially a bottom contact surface, can be formed in more advantageous manner.

The first flat surface is between and spaced apart from the circumferential cutting edge and the insert axis. The first flat surface extends continuously, or in an uninterrupted manner, around the insert axis.

The second flat surface, which is part of the bottom surface, is arranged in a corresponding manner.

According to an embodiment, the top surface comprises a chip control surface between the first support plane and the median plane, wherein the chip control surface is located between the first flat support surface and the first cutting edge portion.

By such a cutting insert, the chip control at large cutting depth is improved.

The top surface comprises a chip control surface, or a top surface portion, positioned or located between the first support plane and the median plane. The chip control surface is located between the first flat support surface and the first cutting edge portion, more specifically between a first sub-portion of the first cutting edge portion and the first flat support surface, where the first sub-portion of the first cutting edge portion is located between the first support plane and the median plane.

Preferably, a portion of the chip control surface is located between the sixth cutting edge portion and the first flat support surface.

The chip control surface is rising in relation to the median plane towards the first flat support surface.

According to an embodiment, each set of cutting edges further comprises a fourth cutting edge portion, a fifth cutting edge portion and a sixth cutting edge portion.

According to an embodiment, there is provided a milling too comprising a cutting insert according to the invention or according to an embodiment and tool body, the tool body being rotatable around a center axis and comprises an insert seat in which the cutting insert is mountable, the insert seat comprises a bottom contact surface adapted to be in contact with the second flat support surface, a first side contact surface and a second side contact surface, wherein each of the first and second side contact surfaces are adapted to be in contact with one first side surface portion, wherein the milling tool is configured such that the third cutting edge portion can form a first flat surface perpendicular the center axis of the tool body and such that the first cutting edge portion can form a second flat surface perpendicular to said first flat surface.

The milling tool and thus the tool body are rotatable around a center axis of the tool body. The tool body is preferably made from steel. The tool body comprises a rear end, which is suitable to be mounted to a rotatable machine tool spindle, and an opposite front end.

Adjacent to said front end, at least one, preferably at least two, even more preferably 3-8 insert seats are formed, wherein one cutting insert is mountable in each insert seat.

The cutting insert is mountable in the insert seat such that the third cutting edge portion is entirely located in a plane perpendicular to the center axis, i.e. the rotational axis, of the tool body When interpreting an angle between a line, such as a cutting edge portion, and a plane, this shall be understood as the angle between an extension of said line and said plane, in the case said line and said plane do not intersect.

DESCRIPTION OF THE DRAWINGS

The present invention will now be explained in more detail by a description of different embodiments of the invention and by reference to the accompanying drawings.

All cutting insert figures have been drawn to scale.

DETAILED DESCRIPTION OF EMBODIMENTS OF THE INVENTION

Figure 3:
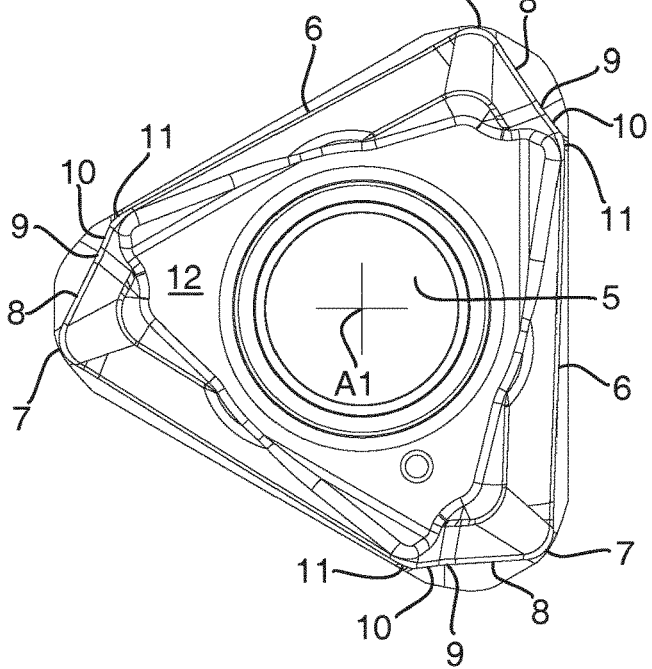
FIG. 3 is a top view of the cutting insert in FIG. 1.
Figure 4:
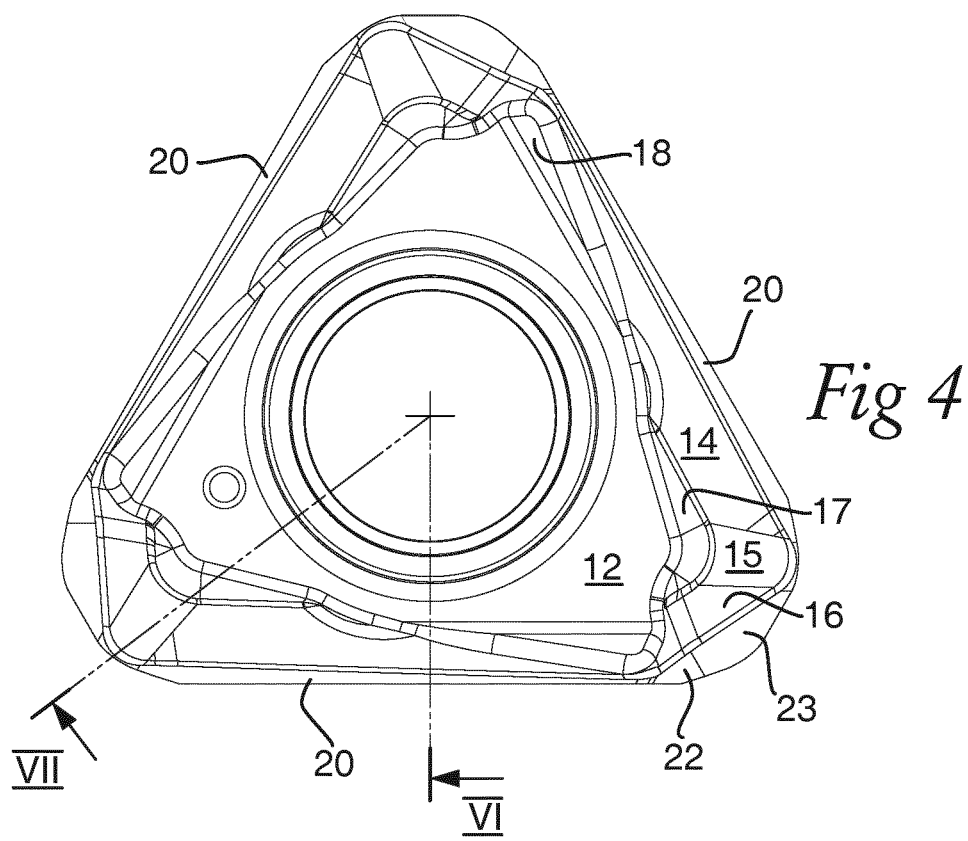
FIG. 4 is a further top view of the cutting insert in FIG. 1.
Figure 5:
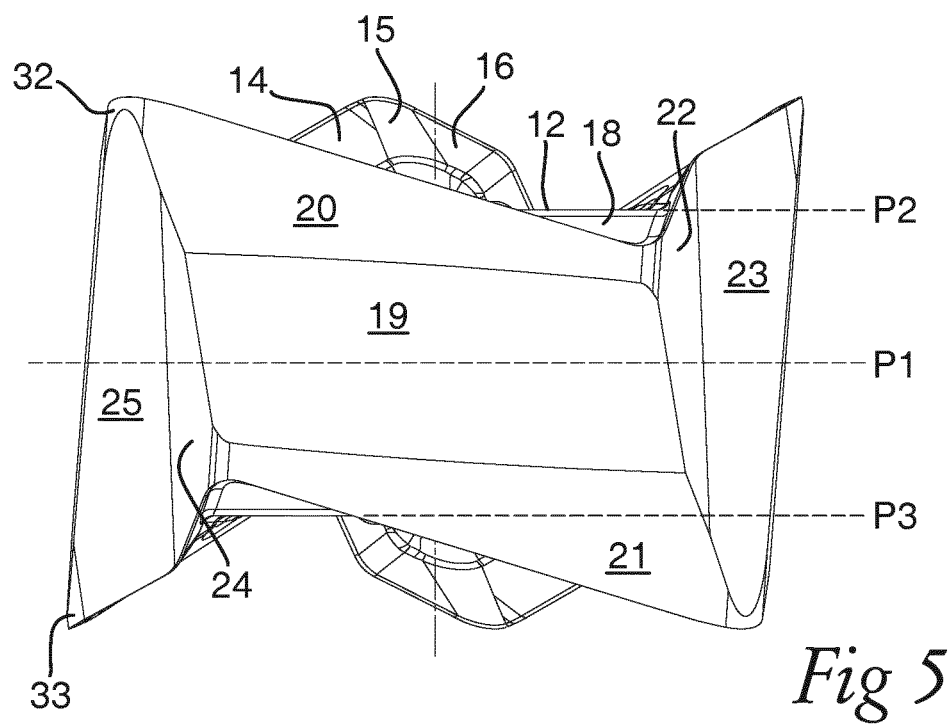
FIG. 5 is a further side view of the cutting insert in FIG. 1.

Reference is made to FIGS. 1-5 showing a cutting insert 1 according to a first embodiment. The reversible cutting insert 1 is a milling insert and comprises opposing and identically or substantially identically top and bottom surfaces 2, 3 interconnected by a continuous peripheral side surface 4. As seen in FIG. 5, a median plane P1 is located between, and equidistantly from, the top and bottom surfaces 2, 3. The median plane P1 intersects the side surface 4. An insert axis A1, which is a central axis, extends perpendicular to the median plane P1. A central hole 5 for a screw is concentric with the insert axis A1. Each top and bottom surface 2, 3 is limited by a rim in the form of a circumferential cutting edge intersecting the side surface 4. The circumferential cutting edge in a top view has a shape thereof of a truncated equilateral triangle. Each circumferential cutting edge comprises three analogous sets of cutting edges exhibiting three-fold rotational symmetry about the insert axis A1.

Each set of cutting edges comprising a first cutting edge portion 6, a second cutting edge portion 7, a third cutting edge portion 8, a fourth cutting edge portion 9, a fifth cutting edge portion 10 and a sixth cutting edge portion 11. The sixth cutting edge portion 11 borders to, i.e. is connected to, a first cutting edge portion 6 forming part of an adjacent set of cutting edges.

As best seen in FIG. 3, the second cutting edge portion 7 is convex in a top view and connects, i.e. is located between and adjacent to, the first cutting edge portion 6 and the third cutting edge portion 8. The second cutting edge portion 7 in a top view has a radius of curvature thereof in the range of 0.3-2.0 mm. The first and third cutting edge portions 6, 8 are both straight or substantially straight in a top view. The first cutting edge portion 6 is longer than the third cutting edge portion 8. The first cutting edge portion 6 and the third cutting edge portion 8 forms a right angle or a substantially right angle in a top view.

In a top view a first straight line from the insert axis A1 to the second cutting edge 7 adjacent to the top surface 2 and a second straight line from the insert axis A1 to a second cutting edge 7 formed adjacent to the bottom surface, form an angle greater than zero in relation to each other. This is best understood from FIG. 1, viewing the part of the cutting insert 1 closest to the viewer.

The first cutting edge portion 6 slopes towards the median plane P1 in a direction away from the second cutting edge portion 7. As seen in e.g. FIGS. 2 and 5, the first cutting edge portion 6 intersects the first support plane P2. The first cutting edge portion 6 is thus divided, by the first support plane P2, into a first sub-portion located between the first support plane P2 and the median plane P1, and a second sub-portion located on the opposite side of the first support plane P2. The length of said first sub-portion is shorter than the length of said second sub-portion.

Seen in e.g. FIGS. 3 and 4, the top surface 2 comprises a first flat surface 12 spaced apart from the circumferential cutting edge, and eniterly located in a first support plane P2 parallel to the median plane P1. The first flat surface 12 extends continuously around the insert axis A1. In a corresponding manner, the bottom surface 3 comprises a second flat surface 13, seen in FIG. 6, spaced apart from the circumferential cutting edge, and entirely located in a second support plane P3 parallel to the median plane P1.

Figure 2:
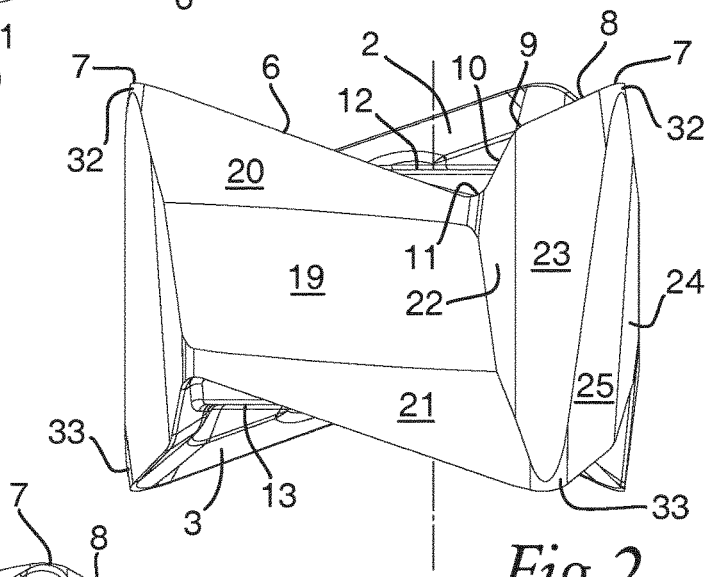
FIG. 2 is a side view of the cutting insert in FIG. 1.

Seen in e.g. FIG. 2, the third cutting edge portion 8 slopes towards the median plane P1 in a direction away from the second cutting edge portion 7. The second cutting edge portions 7 are the most raised portions of the cutting insert 1, in relation to the median plane P1. The third cutting edge portion 8 forms an angle in relation to the median plane P1 which is 26-32°.

As seen in FIG. 3, the fourth cutting edge portion 9 connects the third cutting edge portion 8 and the fifth cutting edge portion 10. The third cutting edge portion 8, the fourth cutting edge portion 9 and the fifth cutting edge portion 10 are aligned in a top view. The sixth cutting edge portion (11) is convex in a top view and concave in a side view.

As seen in FIG. 2, the fourth cutting edge portion 9 is convex in a side view. The fifth cutting edge portion 10 intersect the median plane P1. The sixth cutting edge portion 11 connects the first cutting edge portion 6 and the fifth cutting edge portion 10.

As seen in FIG. 2, the fifth cutting edge portion 10 forms an angle in relation to the median plane P1 which is greater than the angle which the third cutting edge portion 8 forms in relation to the median plane P1.

Seen in FIG. 4, the top surface 2 comprises a first rake surface 14 adjacent to the first cutting edge portion 6, a second rake surface 15 adjacent to the second cutting edge portion 7 and a third rake surface 16 adjacent to the third cutting edge portion 8. The first, second and third rake surfaces 14, 15, 16 are limited by an inner border line spaced apart from the respective adjacent cutting edge portion 6, 7, 8. A greatest distance in a top view, measured perpendicular to the first cutting edge portion 6, from the first cutting edge portion 6 to the inner border line is greater than a greatest distance in a top view, measured perpendicular to the third cutting edge portion 8, from the third cutting edge portion 8 to the inner border line.

Figure 1:
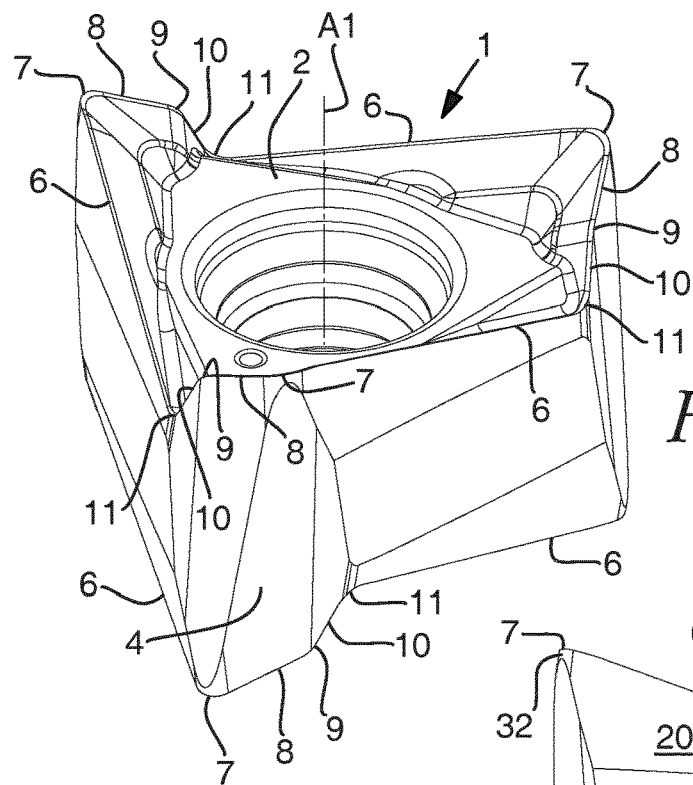
FIG. 1 is a perspective view showing a cutting insert according to a first embodiment.

As best seen in FIG. 1, the first, second and third rake surfaces 14, 15, 16 are sloping towards the first support plane P2 away from the respective adjacent cutting edge portion 6, 7, 8. The first, second and third rake surfaces 14, 15, 16 are sloping towards the median plane P1 away from the respective adjacent cutting edge portion 6, 7, 8.

Figure 6:
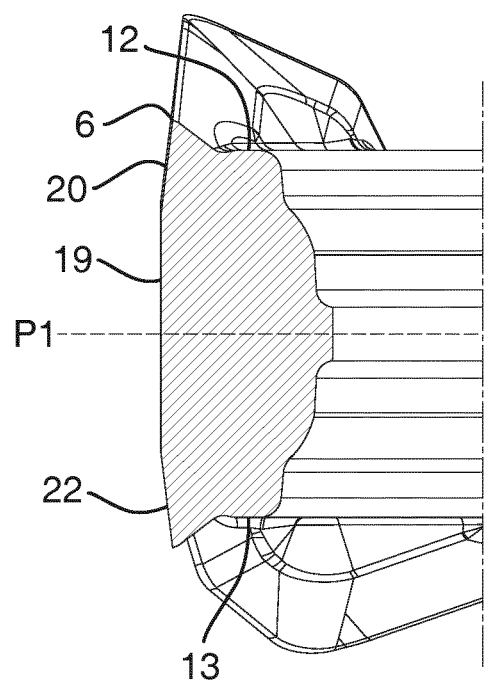
FIG. 6 is a partial cross-sectional view of the cutting insert shown in FIG. 4, taken along the line VI-VI.

A first rake angle, seen in FIG. 6 and defined by the angle which the first rake surface 14 forms in relation to the median plane P1, is greater than a third rake angle, defined by the angle which the third rake surface 16 forms in relation to the median plane P1.

Seen in e.g. FIG. 5, the top surface 2 comprises a chip control surface 18 between the first support plane P2 and the median plane P1. The chip control surface 18 is located between the first flat support surface 12 and the first cutting edge portion 6.

The side surface 4 comprises three analogous sets of surface segments exhibiting three-fold rotational symmetry about the insert axis A1. As seen in e.g. FIG. 5, each set of surface segments comprises a first side surface portion 19, a second side surface portion 20 and a third side surface portion 21, first side surface portion 19 being located between and connecting the second side surface portion 20 and the third side surface portion 21. As seen in e.g. FIGS. 2 and 5, each set of surface segments further comprises a fourth side surface portion 22, a fifth side surface portion 23 a sixth side surface portion 24, a seventh side surface portion 25, an eighth side surface portion 32 and a ninth side surface portion 33. The first side surface portion 19 is located in a plane perpendicular to the median plane P1. The fourth side surface portion 22 borders to the fifth cutting edge portion 10 and is spaced apart from the bottom surface 3. The fifth side surface portion 23 borders to the third cutting edge portion 8 and is spaced apart from the bottom surface 3. The sixth side surface portion 24 borders to a fifth cutting edge portion 10 formed adjacent to the bottom surface. The sixth side surface portion 24 is spaced apart from the top surface 2. The fourth side surface portion 22, the fifth side surface portion 23, the sixth side surface portion 24 and the seventh side surface portion 25 each intersects the median plane P1. The seventh side surface portion 25 borders to a third cutting edge portion 8 formed adjacent to the bottom surface. The seventh side surface portion 25 is spaced apart from the top surface 2. A border line, formed between the fifth side surface portion 23 and the seventh side surface portion 25, forms an angle smaller than 90° in relation to the median plane P1.

As best seen in FIG. 5, in a top view the fifth side surface portion 23 is located a greater distance outwardly in relation to the circumferential cutting edge than all other parts of the side surface 4. In a top view, the second side surface portion 20 is located an increasing or substantially increasing distance outwardly in relation to the circumferential cutting edge from the sixth cutting edge portion 11 towards the second cutting edge portion 7.

As seen in e.g. FIG. 6, the second side surface portion 20 is adjacent to and extending away from the first cutting edge portion 6 intersecting the top surface 2. In a corresponding manner, the third side surface portion 21 is adjacent to and extending away from a first cutting edge portion 6 intersecting the bottom surface 3. Thus, the side surface between substantially opposite first side surface portions 6, bordering to the top and bottom surface 2, 3 respectively, is wider or more spaced apart from the insert axis A1 at the mid portion, intersecting the median plane P1, compared to close to the top and bottom surfaces 2, 3, respectively.

As seen in e.g. FIG. 5, a distance in a side view measured perpendicular to the median plane P1 from the first cutting edge portion 6 to the first side surface portion 19 is decreasing or substantially decreasing away from the second cutting edge portion 7 towards the sixth cutting edge portion 11.

Figure 7:
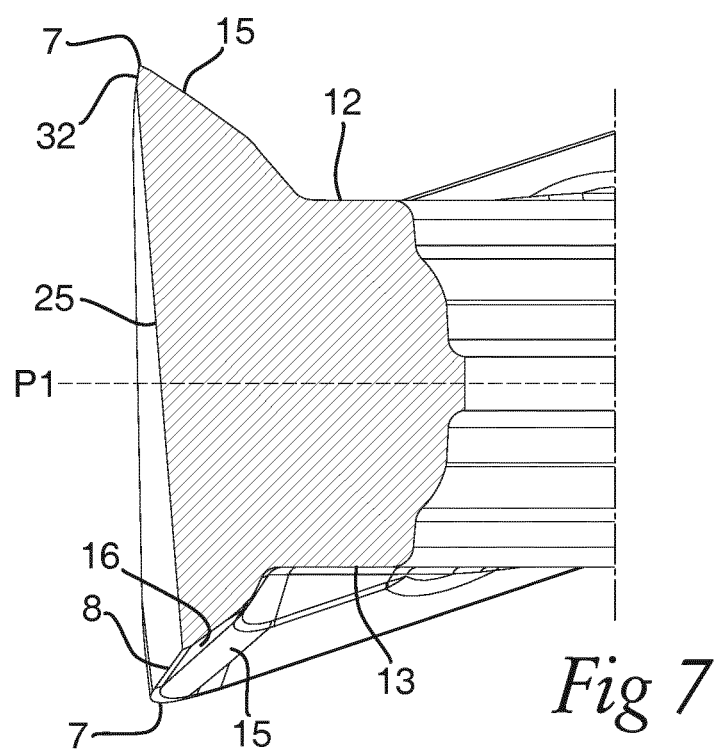
FIG. 7 is a partial cross-sectional view of the cutting insert shown in FIG. 4, taken along the line VII-VII.

As seen in FIG. 7, in a plane comprising the insert axis A1 and a center point of the second cutting edge portion 7, a distance from the insert axis A1 to a point at the side surface 4 intersecting the median plane P1 is shorter than a distance from the insert axis A1 to a center point of the second cutting edge portion 7.

Shown in e.g. FIGS. 1 and 2, an eighth side surface portion 32 is limited by an upper boundary line comprising the second cutting edge portion 7, an opposite lower boundary line, and two opposite side boundary lines. A shortest distance from said upper boundary line to said opposite lower boundary line is 0.1-0.6 mm.

Figure 8:
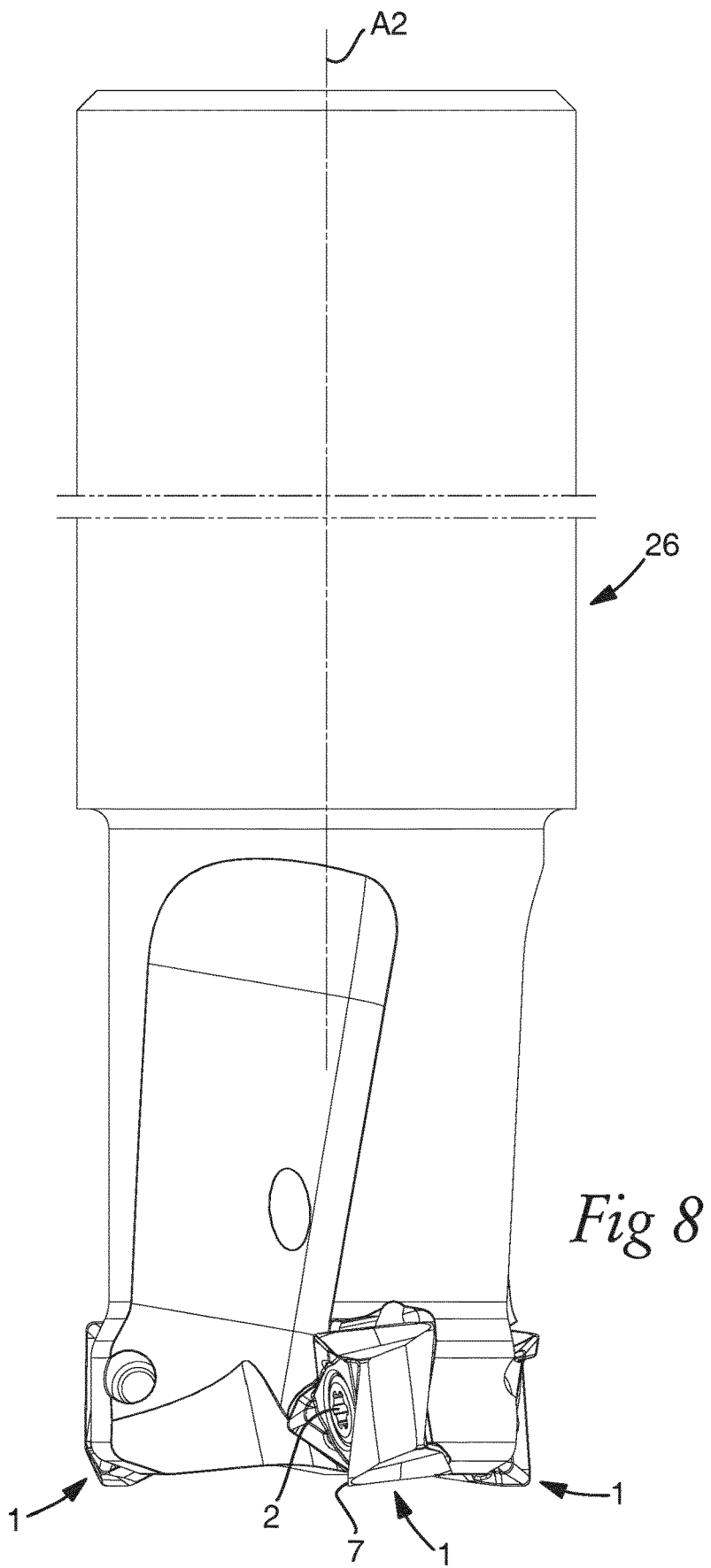
FIG. 8 is a side view of a milling tool comprising a tool body and a plurality of cutting inserts according to the first embodiment.
Figure 9:
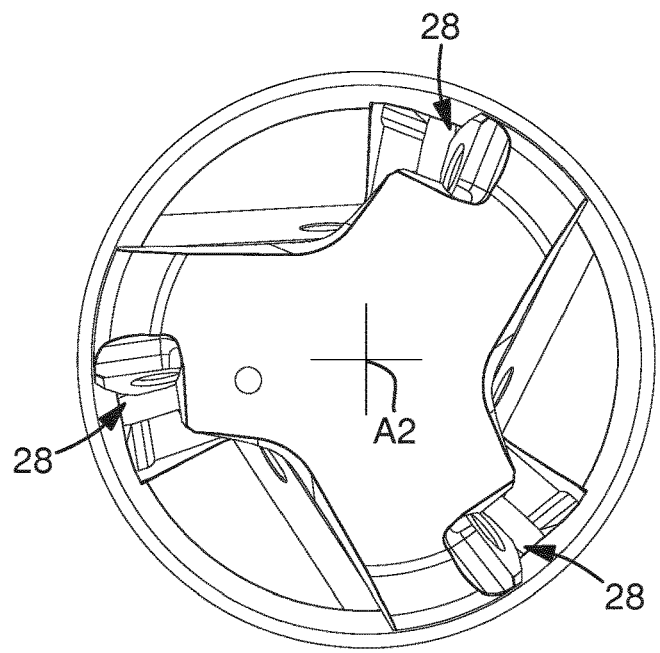
FIG. 9 is an end view of the tool body in FIG. 8.
Figure 10:
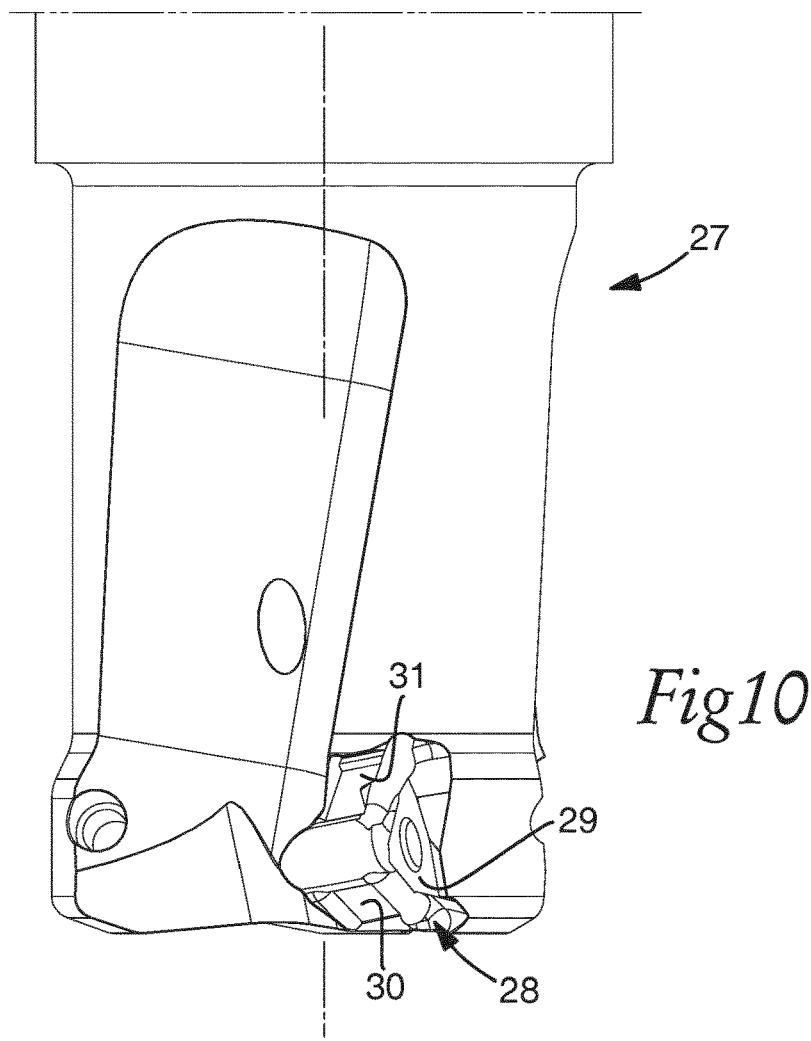
FIG. 10 is a side view of the tool body in FIG. 9.

FIG. 8 shows a milling tool 26 comprising a plurality of cutting inserts 1 according to the first embodiment and tool body 27. The cutting inserts are mounted in insert seats 28, seen in FIG. 9. The tool body 27 is rotatable around a center axis A2. As seen in FIG. 10, the insert seat 28 comprises a bottom contact surface 29 adapted to be in contact with the second flat support surface 13, a first side contact surface 30 and a second side contact surface 31. Each of the first and second side contact surfaces 30, 31 are adapted to be in contact with one of the first side surface portions 19. The milling tool 26 is configured such that the third cutting edge portion 8 can form a first flat surface perpendicular the center axis A2 of the tool body 27 and such that the first cutting edge portion 6 can form a second flat surface perpendicular to said first flat surface.

The invention claimed is:

1. A reversible cutting insert for milling, comprising:
opposing and identical top and bottom surfaces interconnected by a continuous peripheral side surface, a median plane being located between the top and bottom surfaces and intersecting the peripheral side surface, and an insert axis extending perpendicular to the median plane about which the cutting insert is indexable, each top and bottom surface being limited by a circumferential cutting edge intersecting the side surface, the circumferential cutting edge in a top view having the shape of a truncated equilateral triangle, each circumferential cutting edge including three analogous sets of cutting edges exhibiting a three-fold rotational symmetry about the insert axis;
each set of cutting edges including a first cutting edge portion, a second cutting edge portion, a third cutting edge portion, a fourth cutting edge portion, a fifth cutting edge portion and a sixth cutting edge portion, the second cutting edge portion being convex in a top view and connecting the first cutting edge portion and the third cutting edge portion, the first and third cutting edge portions each being straight in a top view, the first cutting edge portion being longer than the third cutting edge portion, the first cutting edge portion and the third cutting edge portion forming a right angle in a top view, the first cutting edge portion sloping towards the median plane away from the second cutting edge portion, the top surface having a first flat surface, the first flat surface being spaced apart from the circumferential cutting edge, the first flat surface being located in a first support plane parallel to the median plane;
the bottom surface including a second flat surface, the second flat surface being spaced apart from the circumferential cutting edge, the second flat surface being located in a second support plane parallel to the median plane; and
the side surface including three analogous sets of surface segments exhibiting three-fold rotational symmetry about the insert axis, each set of surface segments having a first side surface portion, a second side surface portion and a third side surface portion, the first side surface portion being located between and connecting the second side surface portion and the third side surface portion, the second side surface portion being adjacent to and extending away from the first cutting edge portion intersecting the top surface, and the third side surface portion being adjacent to and extending away from a first cutting edge portion intersecting the bottom surface, wherein in a top view a first straight line from the insert axis to the second cutting edge adjacent to the top surface and a second straight line from the insert axis to a second cutting edge formed adjacent to the bottom surface form an angle greater than zero, and wherein the first cutting edge portion intersects the first support plane.

2. The cutting insert according to claim 1, wherein the third cutting edge portion slopes towards the median plane away from the second cutting edge portion, and wherein the third cutting edge portion forms an angle in relation to the median plane which is 26-32°.

3. The cutting insert according to claim 1, wherein the first cutting edge portion is divided into a first sub-portion located between the first support plane and the median plane, and a second sub-portion located on the opposite side of the first support plane, wherein the length of said first sub-portion is shorter than the length of said second sub-portion.

4. The cutting insert according to claim 1, wherein a fourth cutting edge portion connects the third cutting edge portion and a fifth cutting edge portion, wherein the third cutting edge portion, the fourth cutting edge portion and the fifth cutting edge portion are aligned in a top view, wherein the fourth cutting edge portion is convex in a side view, wherein the fifth cutting edge portion intersect the median plane, wherein a sixth cutting edge portion connects the first cutting edge portion and the fifth cutting edge portion, and wherein the sixth cutting edge portion is convex in a top view and concave in a side view.

5. The cutting insert according to claim 4, wherein the fifth cutting edge portion forms an angle in relation to the median plane which is greater than the angle which the third cutting edge portion forms in relation to the median plane.

6. The cutting insert according to claim 1, wherein in a plane including the insert axis and a center point of the second cutting edge portion, a distance from the insert axis to a point at the side surface intersecting the median plane is shorter than a distance from the insert axis to a center point of the second cutting edge portion.

7. The cutting insert according to claim 1, wherein each set of surface segments includes a fourth side surface portion, a fifth side surface portion, a sixth side surface portion, a seventh side surface portion, and an eighth side surface portion, the eighth side surface portion being limited by an upper boundary line including the second cutting edge portion, an opposite lower boundary line, and two opposite side boundary lines, wherein a shortest distance from said upper boundary line to said opposite lower boundary line is 0.1-0.6 mm.

8. The cutting insert according to claim 1, wherein the top surface includes a first rake surface adjacent to the first cutting edge portion, a second rake surface adjacent to the second cutting edge portion and a third rake surface adjacent to the third cutting edge portion, wherein the first, second and third rake surfaces are sloping towards the first support plane away from a respective adjacent cutting edge portion, wherein the first, second and third rake surfaces are limited by an inner border line spaced apart from the respective adjacent cutting edge portion, wherein a greatest distance in a top view, measured perpendicular to the first cutting edge portion, from the first cutting edge portion to the inner border line is greater than a greatest distance in a top view, measured perpendicular to the third cutting edge portion, from the third cutting edge portion to the inner border line.

9. The cutting insert according to claim 1, wherein the top surface includes a first rake surface adjacent to the first cutting edge portion, a second rake surface adjacent to the second cutting edge portion and a third rake surface adjacent to the third cutting edge portion, wherein the first, second and third rake surfaces are sloping towards the median plane away from the respective adjacent cutting edge portion, wherein a first rake angle, defined by an angle which the first rake surface forms in relation to the median plane, is greater than a third rake angle, defined by an angle which the third rake surface forms in relation to the median plane.

10. The cutting insert according to claim 4, wherein a distance in a side view measured perpendicular to the median plane from the first cutting edge portion to the first side surface portion decreases away from the second cutting edge portion towards the sixth cutting edge portion.

11. The cutting insert according to claim 1, wherein each set of cutting edges further comprises a fourth cutting edge portion, a fifth cutting edge portion and a sixth cutting edge portion, wherein each set of surface segments includes a fourth side surface portion, a fifth side surface portion a sixth side surface portion, a seventh side surface portion, a eighth side surface portion and a ninth side surface portion, wherein the first side surface portion is located in a plane perpendicular to the median plane, wherein the fourth side surface portion borders to the fifth cutting edge portion and is spaced apart from the bottom surface, wherein the fifth side surface portion borders to the third cutting edge portion and is spaced apart from the bottom surface, wherein the sixth side surface portion borders to a fifth cutting edge portion formed adjacent to the bottom surface, and wherein the sixth side surface portion is spaced apart from the top surface, wherein the fourth side surface portion, the fifth side surface portion, the sixth side surface portion and the seventh side surface portion each intersects the median plane, wherein the seventh side surface portion borders to a third cutting edge portion formed adjacent to the bottom surface, and wherein the seventh side surface portion is spaced apart from the top surface, wherein a border line, formed between the fifth side surface portion and the seventh side surface portion, forms an angle smaller than 90° in relation to the median plane, wherein in a top view, the fifth side surface portion is located a greater distance outwardly in relation to the circumferential cutting edge than all other parts of the side surface, wherein in a top view, the second side surface portion is located at an increasing distance outwardly in relation to the circumferential cutting edge from the sixth cutting edge portion towards the second cutting edge portion.

12. The cutting insert according to claim 1, wherein the first flat surface extends continuously around the insert axis.

13. The cutting insert according to claim 1, wherein the top surface includes a chip control surface between the first support plane and the median plan, and wherein the chip control surface is located between the first flat support surface and the first cutting edge portion.

14. A milling tool comprising: a cutting insert according to claim 1; and a tool body, the tool body being rotatable around a center axis and including an insert seat in which the cutting insert is mountable, the insert seat having a bottom contact surface arranged to contact the second flat support surface, a first side contact surface and a second side contact surface, wherein each of the first and second side contact surfaces are arranged to contact one first side surface portion, wherein the milling tool is configured such that the third cutting edge portion forms a first flat surface perpendicular to the center axis of the tool body and such that the first cutting edge portion forms a second flat surface perpendicular to said first flat surface.

\* \* \* \* \*